Patented Mar. 6, 1928.

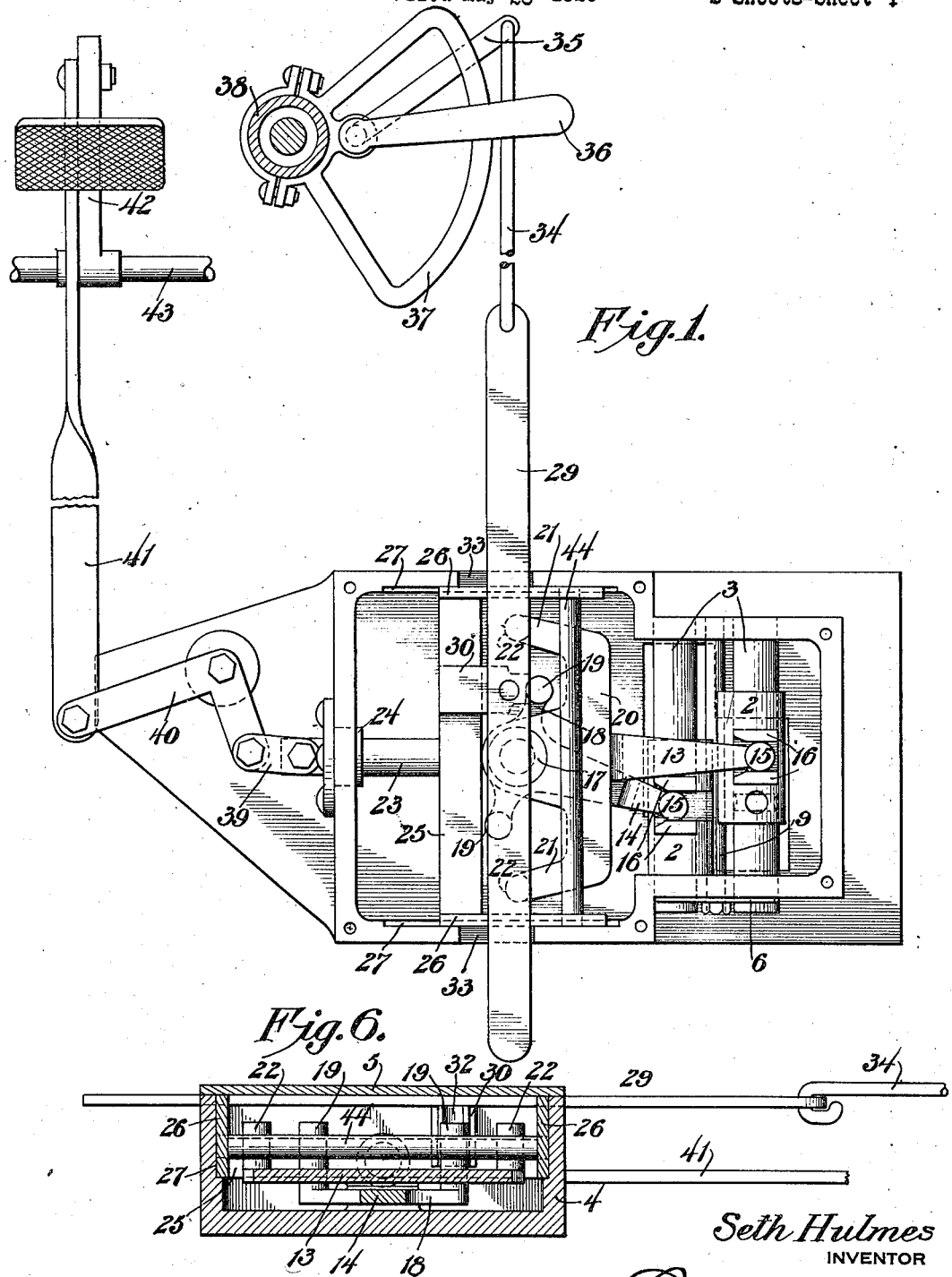

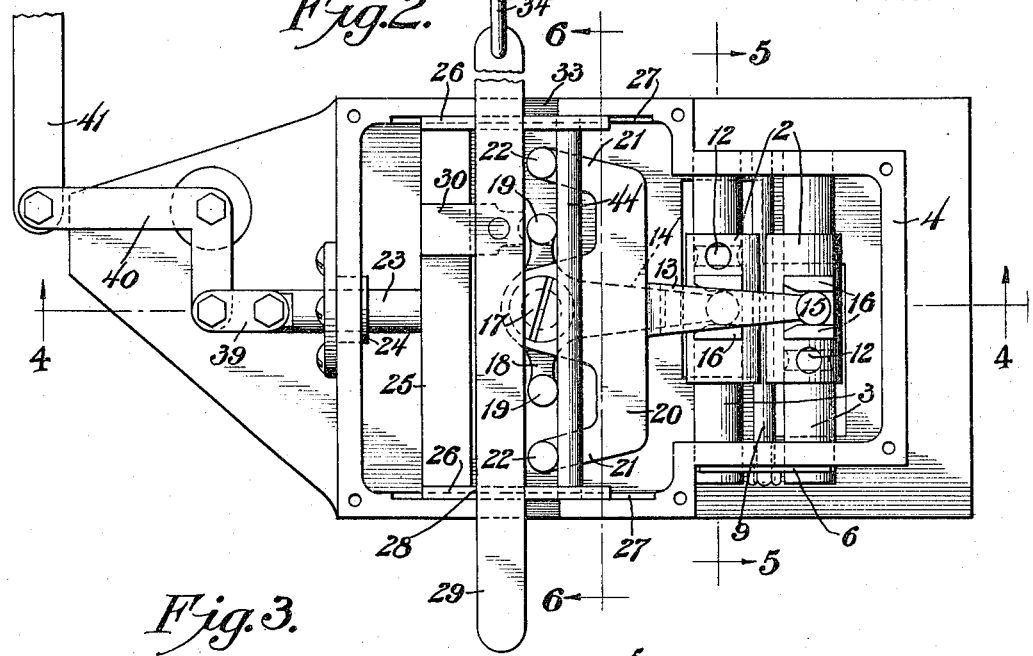

1,661,612

UNITED STATES PATENT OFFICE.

SETH HULMES, OF BEAVER FALLS, PENNSYLVANIA.

GEAR-SHIFTING MECHANISM.

Application filed May 28, 1926. Serial No. 112,323.

This invention relates to a gear shifting mechanism, especially adapted to be used in connection with the clutch and slidable gear transmission commonly used in automoblies.

The general object of the invention is to provide a simple and inexpensive mechanism for the purpose stated which is positive in its operation, which makes it easy, even for a novice, to select and effect the desired shift, which does away with all danger of breaking the gear teeth, and which renders it impossible for a gear to slip out of mesh until the driver intentionally makes another shift.

The structural details and the advantages resulting therefrom will be more fully explained in connection with the accompanying drawings, which illustrate the invention in its preferred form.

In the drawings:

Figure 1 is a plan view of the shifting mechanism in operative position with the cover of the housing removed, and also illustrates the relation of the hand actuating lever and clutch pedal thereto.

Figure 2 is a plan view showing the shifting mechanism in neutral position.

Figure 3 is a side elevation of the housing containing the shifting mechanism.

Figure 4 is a section taken on the line 4—4 of Figure 2.

Figure 5 is a section taken on the line 5—5 of Figure 2.

Figure 6 is a section taken on the line 6—6 of Figure 2.

The preferred form of the invention is shown in connection with gear shifting yokes 1, of well known form, having sleeves 2, slidably mounted on bars 3 which are disposed longitudinally above the transmission. The bars 3 are supported in a housing 4 having a removable cover plate 5, and a latch plate 6, secured to the rear side of the housing, engages a notch 7 in each bar 3 to secure the latter in the housing. The adjacent sides of the sleeves 2 are formed with opposed grooves 8, which slidably engage a rod 9 secured in the housing midway between the bars 3, so as to permit the yokes 1 to be moved longtudinally, but not rotatively. Each sleeve 2 is formed with a pocket 10 containing a spring held pin 11, engageable with a groove 12 in the bar 3 when the latter is in neutral position, so as to yieldably hold the same against displacement.

The longitudinal movement of the yokes 1, to effect the desired shift, is accomplished through the medium of levers 13 and 14 located within the housing 4, one above the other, and each terminating in a head 15 located between upstanding ears 16 formed on the respective sleeves 2. The levers 13 and 14 are pivotally mounted on a stud 17 screwed to the bottom of the housing. The lever 14 is formed with a cross head 18, terminating in upstanding pins 19, and the lever 13 is provided with a cross head 20 located to one side of the cross head 18, so as not to interfere with the independent movement of the pins 19. The cross head 20 extends beyond the cross head 18, and has laterally turned end portions 21, which terminate in upstanding pins 22. The pins 19 and 22 and the pivot stud 17 are all disposed in the same vertical longitudinal plane when the mechanism is in neutral position, as shown in Figure 2.

The shifting movement is effected through the medium of a plunger bar 23, mounted in a removable bushing 24 at one side of the housing, and having a cross head 25 with guide plates 26 secured to its ends, and slidably mounted in channels 27 formed in the walls of the housing. The plates 26 are formed with opposed slots 28, which slidably receive a selector bar 29. A block 30 is secured to the selector bar, and is formed with a rabbet or channel 31 adapted to receive the cross head 25, and is slidable thereon. The side of the block 30 is formed with a semi-cylindrical recess 32 adapted to engage the pins 19 or 22, which has been selected by the longitudinal movement of the selector bar 29, and to rock the corresponding lever 13 or 14 when the plunger bar 23 is advanced. The selector bar 29 extends through slots 33 in the housing, which are long enough to permit the selector bar to be advanced with the plunger bar 23 in effecting the shift.

For moving the selector bar 29 longitudinally, its front end is connected by a link 34 to the end of a lever 35, which is secured in fixed relation to a hand lever 36, associated with a sector 37 secured to the steering column 38 adjacent the steering wheel.

For effecting the movement of the plunger bar 23, the outer end of the latter is connected by a link 39 to one end of a bell crank 40, pivotally mounted on the outside of the housing 4. The other end of the bell crank is connected by a link bar 41 to the clutch pedal 42, which is secured to the clutch controlling shaft 43. A bar 44 is connected to the plates 26 in position to engage any one of the pins 19 or 22 which has been advanced, and to restore the corresponding lever 13 or 14 to neutral position whenever the plunger bar 23 is retracted.

In the operation of the mechanism herein described, when it is desired to shift gears, the clutch pedal 42 is first depressed. This retracts the plunger bar 23, and with it the selector bar 29 to the position shown in Figure 2. At the same time, the bar 44 engages whichever pin 19 or 22 has previously been advanced, and moves the yokes 1 and thereby the transmission gears to neutral position. The hand lever 36 is then actuated to move the selector bar 29 longitudinally, until the block 30 is opposite the pin 19 or 22, corresponding to the desired shift. The clutch pedal 42 is then released, and as it rises, the plunger bar 23 and the selector bar 29 are advanced to the position shown in Figure 1, thereby advancing the pin 19 or 22, which is then opposite the block 30. By moving the selector bar 29, therefore, so that the block 30 is opposite the proper pin, the release of the clutch pedal will cause either one of the yokes 1 to be moved either forwardly or backwardly as is necessary to effect the shift selected.

From the foregoing description, it will be seen that it is impossible to effect the shift until the clutch pedal has first been depressed, so that all danger of breaking the gear teeth is eliminated. The gears are all moved to neutral position simultaneously with the depression of the clutch pedal. After the hand lever 35 has been set in the position corresponding to the shift desired, all that is necessary in order to effect the shift is to remove the foot from the clutch pedal 42. This greatly simplifies the gear shifting operation, so that it may be effected, even by a novice, with absolutely no danger of breaking the teeth.

While I have shown and described in detail the specific construction and arrangement of the invention in what seems to be at present its prefered form, it is apparent that various modifications may be made therein without any material departure from the salient features thereof as expressed in the claims.

What is claimed is:

1. In a gear shifting mechanism, the combination of two shifting yokes mounted side by side and longitudinally slidable, a pair of pivoted levers, each being directly connected to one of the yokes and rockable to shift the same in either direction, a selector bar longitudinally adjustable to select the desired shift, means for moving the selector bar laterally, and means cooperable with the selector bar when moved laterally to selectively rock either one of the levers in either direction according to the longitudinal adjustment of the selector bar.

2. In a gear shifting mechanism, the combination of two shifting yokes mounted side by side and longitudinally slidable, an individual pivoted lever for each yoke and operable to shift the same in either direction, each lever being directly connected to one of the yokes and having a cross head, with a pin at each end, a selector bar having a block secured thereto, said bar being longitudinally adjustable to selectively position the block opposite any one of the pins, and means for moving the selector bar laterally to cause the block to engage the pin opposite the same, whereby to selectively rock either one of the levers in either direction according to the selection made.

3. In a gear shifting mechanism, the combination of two longitudinally slidable shifting yokes, a pair of pivoted levers, each being directly connected to one of the yokes and rockable to shift the same in either direction, a selector bar longtiudinally adjustable to select the desired shift, means secured to the selector bar and operable selectively upon the levers to effect the selected shift when the selector bar is moved laterally in one direction, means for effecting said lateral movement, and means operable upon the shifted lever to restore it to neutral position and thereby move said selector bar laterally in the opposite direction.

4. In a gear shifting mechanism, the combination of two longitudinally slidable shifting yokes, a pair of pivoted levers, each being directly connected to one of the yokes and rockable to positively shift the same in either direction, a selector bar longitudinally adjustable to select the desired shift, a clutch pedal, means connected with the clutch pedal and operable by movement thereof to move the selector bar laterally, and means cooperable with the selector bar, when so moved, to selectively rock either one of the levers in either direction according to the longitudinal adjustment of the selector bar.

5. In a gear shifting mechanism, the combination of two longitudinally slidable shifting yokes, an individual pivoted lever for each yoke and operable to shift the same in either direction, each lever having a cross head with an upstanding pin at each end providing operating arms to rock the levers, a selector bar having a block secured thereto, said bar being longitudinally adjustable to selectively position the block opposite any one of the pins, a clutch pedal, and means connected with the clutch pedal and operable by movement thereof to move the selector bar laterally to cause the block to engage the pin opposite the same, whereby to selectively rock either one of the levers in either direction according to the selection made.

6. In a gear shifting mechanism, the combination of two shifting yokes mounted side by side and longitudinally slidable, an individual lever for each yoke directly connected thereto and rockable to shift the same in either direction, a selector bar longitudinally adjustable to select the desired shift, means secured to the selector bar and operable selectively upon the levers to effect the selected shift when the selector bar is moved laterally in one direction, a slidably mounted plunger disposed substantially at right angles to the selector bar and adapted to be advanced to effect said lateral movement, means connected to the plunger and operable, when the plunger is retracted to restore the shifted lever to neutral position and thereby move said selector bar laterally in the opposite direction, and means for controlling the movement of the plunger.

7. In a gear shifting mechanism, the combination of two longitudinally slidable shifting yokes, a single pivoted lever for each yoke directly connected thereto and rockable to shift the same in either direction, a selector bar longitudinally adjustable to select the desired shift, means secured to the selector bar and operable selectively upon the levers to effect the selected shift when the selector bar is moved laterally in one direction, means for effecting said lateral movement, means operable upon the shifted lever to restore it to neutral position and thereby move said selector bar laterally in the opposite direction, a clutch pedal, and means connecting the pedal to the means for moving the selector bar laterally, so that upon depression of the lever the shift to neutral position is effected, and upon release of said pedal the selector bar is moved to effect the shift selected.

8. In a gear shifting mechanism, the combination of two longitudinally slidable shifting yokes, an individual pivoted lever for each yoke directly connected thereto and operable to shift the same in either direction, a selector bar longitudinally adjustable to select the desired shift, means secured to the selector bar and operable selectively upon the levers to effect the selected shift when the selector bar is moved laterally in one direction, a slidably mounted plunger disposed substantially at right angles to the selector bar and adapted to be advanced to effect said lateral movement, means connected to the plunger and operable, when the plunger is retracted, to restore the shifted lever to neutral position and thereby move said selector bar laterally in the opposite direction, a clutch pedal, and means connecting the pedal to the means for moving the selector bar laterally, so that upon depression of the pedal the shift to neutral position is effected, and upon release of said pedal the selector bar is moved to effect the shift selected.

9. In a gear shifting mechanism, the combination of two longitudinally slidable shifting yokes, an individual pivoted lever for each yoke directly connected thereto and rockable to shift the same in either direction, a selector bar longitudinally adjustable to select the desired shift, means for moving the selector bar laterally, means cooperable with the selector bar, when so moved, to selectively rock either one of the levers in either direction according to the longitudinal adjustment of the selector bar, and means positively preventing the longitudinal shifting of the bar to another selective position unless the shifted lever has first been restored to neutral position.

10. In a gear shifting mechanism having a plurality of shiftable yokes, a plurality of superposed levers pivoted on a common axis, one for each yoke; cross arms on each lever having vertical pins at their ends; all of said pins being arranged in alignment when the yokes are moved to neutral position; a clutch pedal actuated plunger member having a bar adapted to engage the pins to bring them in alignment when the clutch pedal is pushed forwardly; a slidable selector bar connected to be shifted with the plunger member; and a single pin engaging member on said selector bar adapted to selectively engage with any one of said aligned pins on the opposite side from the pin aligning bar and arranged to shift the pin and its lever as the clutch pedal is released.

In testimony, that I claim the foregoing as my own, I have hereto affixed my signature.

SETH HULMES.